US011618609B2

(12) United States Patent
Dykeman (10) Patent No.: US 11,618,609 B2
(45) Date of Patent: Apr. 4, 2023

(54) APPARATUS FOR SAFER CHICK TRANSPORTATION

(71) Applicant: MacKenzie Monica Dykeman, Langley (CA)

(72) Inventor: MacKenzie Monica Dykeman, Langley (CA)

(\*) Notice: Subject to any disclaimer, the term of this patent is extended or adjusted under 35 U.S.C. 154(b) by 0 days.

(21) Appl. No.: 16/778,700

(22) Filed: Jan. 31, 2020

(65) Prior Publication Data

US 2020/0247577 A1 Aug. 6, 2020

Related U.S. Application Data

(60) Provisional application No. 62/799,676, filed on Jan. 31, 2019.

(51) Int. Cl.
| | |
|---|---|
| *B65D 5/49* | (2006.01) |
| *B65D 5/42* | (2006.01) |
| *B65D 81/18* | (2006.01) |
| *B65D 85/50* | (2006.01) |
| *A01K 31/00* | (2006.01) |

(52) U.S. Cl.
CPC ........ *B65D 5/48024* (2013.01); *A01K 31/002* (2013.01); *B65D 5/4295* (2013.01); *B65D 81/18* (2013.01); *B65D 85/50* (2013.01)

(58) Field of Classification Search
CPC .. B65D 5/48024; B65D 5/32; B65D 5/48026; B65D 5/64; B65D 5/4804; B65D 5/12; B65D 5/4295; B65D 81/263; B65D 85/50; B65D 5/50; B65D 75/14; B65D 5/60; B65D 5/5045; Y10S 229/916; A01K 1/0245; A01K 45/005; A01K 31/18; A01K 31/002; A01K 31/07; A01K 31/14; A01K 41/00; A01K 41/023; A01K 1/0035; A01K 1/0236; A01M 23/16
USPC .......... 119/496, 453, 452, 437, 493
See application file for complete search history.

(56) References Cited

U.S. PATENT DOCUMENTS

| | | | | |
|---|---|---|---|---|
| 1,082,116 | A | * | 12/1913 | Ellegaard ............... A01K 31/18 119/310 |
| 2,026,417 | A | * | 12/1935 | Conway ............... B65D 5/4295 119/490 |
| 2,273,390 | A | | 2/1942 | Warren |
| 2,309,720 | A | * | 2/1943 | Washburn ............. A01K 31/19 119/309 |
| 2,328,689 | A | * | 9/1943 | Shofer ................. B65D 5/4295 229/120.1 |

(Continued)

*Primary Examiner* — Peter M Poon
*Assistant Examiner* — Jeffrey R Larsen
(74) *Attorney, Agent, or Firm* — Marin Patents LLC; Gustavo Marin (57) ABSTRACT

A box for safe chick transportation comprises a truncated or frusto-section of a rectangular pyramid structure, with a greater lineal dimension at the base of the compartment than at its top such that when grouped in any number in excess of two, they provide a V-shaped passageway for adequate ventilation between the plurality of boxes. A vertically aligned cylindrical insert placed within the rectangular pyramid structure encompassing at least a portion of the internal area thereby eliminating corners to decrease chick mortality. The rectangular pyramid structure a base compartment operable to receive a temperature control element therein for temperature control of the box contents.

16 Claims, 11 Drawing Sheets

(56) References Cited

U.S. PATENT DOCUMENTS

| | | | | |
|---|---|---|---|---|
| 2,329,637 | A | * | 9/1943 | Miller .................. B65D 5/4295 |
| | | | | 229/120.1 |
| 3,108,569 | A | | 10/1963 | Kundikoff |
| 3,306,258 | A | * | 2/1967 | Hunt ...................... B65D 5/323 |
| | | | | 119/496 |
| 3,916,836 | A | * | 11/1975 | Justl ......................... A01K 1/03 |
| | | | | 119/428 |
| 6,338,316 | B1 | * | 1/2002 | Weaver ................ A01K 31/002 |
| | | | | 119/493 |
| 2017/0035030 | A1 | * | 2/2017 | Thrane ................ A01K 45/005 |
| 2019/0230894 | A1 | * | 8/2019 | Pan ...................... A01K 1/0158 |

\* cited by examiner

APPARATUS FOR SAFER CHICK TRANSPORTATION

CROSS-REFERENCE TO RELATED APPLICATIONS

This application claims the benefit of, and priority to U.S. provisional application 62/799,676 titled, "APPARATUS FOR SAFER CHICK TRANSPORTATION" filed on Jan. 31, 2019, the entire specification of which are incorporated herein by reference.

BACKGROUND OF THE INVENTION

Field of the Art

The disclosure relates to the field of poultry container construction, and more particularly to an improved vessel for carrying and transporting live chicks.

Discussion of the State of the Art

Poultry transportation is one of the most critical and visible components of the farmed poultry production. There is an obligation within all segments of the poultry supply chain to ensure the humane treatment and handling of poultry while minimizing stress to the birds during handling, processing and, most importantly, during transportation.

Industrial hatcheries incubate and hatch thousands to millions of birds every week to supply the poultry industry. Nearly all poultry that are shipped to farms via trucks and planes are day-old chicks. Day-old poultry hatch with a built-in food and water supply in the form of a yolk sac inside their bodies. When properly cared for, a chick can meet their water and nutrition requirements for up to three days from the time they are hatched without supplementation. Accordingly, the industry provides guidelines on transportation based on a chick's ability to self-nourish without supplementation, that is, transportation should be minimized and should not exceed three days, while ideally not exceed 48 hours. However, a common problem that exists is that delays are commonplace and often the duration of transportation exceeds the recommended guidelines.

Further, though hatchlings initially comprise of a high internal body temperature, they are unable to self-regulate their temperature in the first two weeks of life. An environment that is too hot or too cold can result in a high mortality rate, specifically during transportation due to the challenges and expense involved in properly outfitting or using transportation vehicles equipped to transport day-old chicks. If a chick's body temperature is too hot, it will pant with its beak open, spread out its wings, and move away from other chicks, if possible. If it is not able to rid itself of excessive heat, it may suffer permanent damage or death. If the transportation vessel is too cold, birds will huddle together for warmth. If they are still cold, they may pile on top of each other or congregate in one or more sections of the vessel resulting in one or more chicks being smothered and/or trapped within the corners of the vessel since transportation vessels known in the art are typically rectangular in shape.

Though the industry reports a 2% mortality rate, common knowledge amongst farmers suggests that the mortality rate is much higher whereby poultry shipped via postal, courier service, truck or plane, the chicks often arrive cold, underweight or trampled. Further, some chicks arrive morbidly damaged in an irreversible state that they do not survive past a few more days. This creates a problem not only with the humane treatment of poultry but affects profitability for the poultry farmer since there is a reduced number of chicks, and since replacement shipments comprise day-old chicks (following a similar risk path as outlined above) rather than the new chick being replaced with a chick of the same age as the lost chick, that is, if a chick dies at 5 or 6 days old, it is replaced with a chick that is one-day old.

Accordingly, what is needed in the art is an apparatus to reduces chick mortality that mitigates the risk factors described above by removing areas where chicks are smothered or damaged. What is further needed in the art is a transportation apparatus and that can regulate temperature for transport vessels to accommodate the temperature that chicks require based on the ambient temperature. What is further needed in the art is a reliable shipping method that reduces mortality for shipments of chicks, treats them in the most humane way possible, and increases profitability for farmers.

SUMMARY OF THE INVENTION

Accordingly, the inventor has conceived and reduced to practice, in a preferred embodiment of the invention, an apparatus for safe chick transportation.

According to a preferred embodiment of the invention, a box for safe chick transportation comprises a truncated or frusto-section of a rectangular pyramid structure, with a greater lineal dimension at the base of the compartment than at its top such that when grouped in any number in excess of two, they provide a V-shaped passageway for adequate ventilation between the plurality of boxes. Further according to the embodiment, a vertically aligned cylindrical insert is placed within the rectangular pyramid encompassing at least a portion of the internal area thereby eliminating corners. In a preferred embodiment, the circumference of the cylindrical insert corresponds to the width and length of the box. In some embodiments, a base compartment is disclosed whereby a temperature control element may be inserted therein for temperature control of the box contents.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

DETAILED DESCRIPTION

The inventor has conceived, and reduced to practice, improved vessel for carrying and transporting live chicks.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions.

Mechanisms described or referenced herein will sometimes be described in singular form for clarity. However, it should be appreciated that particular embodiments may include multiple instantiations of a mechanism unless noted otherwise. Blocks in figures may, in some embodiments, be understood as representing segments or portions of those embodiments. Alternate implementations are included within the scope of embodiments of the present invention would be understood by those having ordinary skill in the art.

Definitions

Chicks as used herein may include hatchlings, that is, a young animal that recently emerged from an egg of class: Ayes (essentially all birds), Gallus Domesticus, Meleagris Gallopavio, Galliformes, and the like.

A plurality of chickens, as used herein may be a flock, brood (of hens), clutch (of chicks), or peep (of chicks).

The apparatus for safe chick transportation may also be referred to herein as box, vessel, and structure, which refers to a container for shipping poultry.

A cylindrical insert as used herein may refer to a three-dimensional curvilinear geometric shape resembling a "tin can" without lids. Cylinder as used herein may include an elliptical cylinder.

EXEMPLARY EMBODIMENTS

Figure 1:
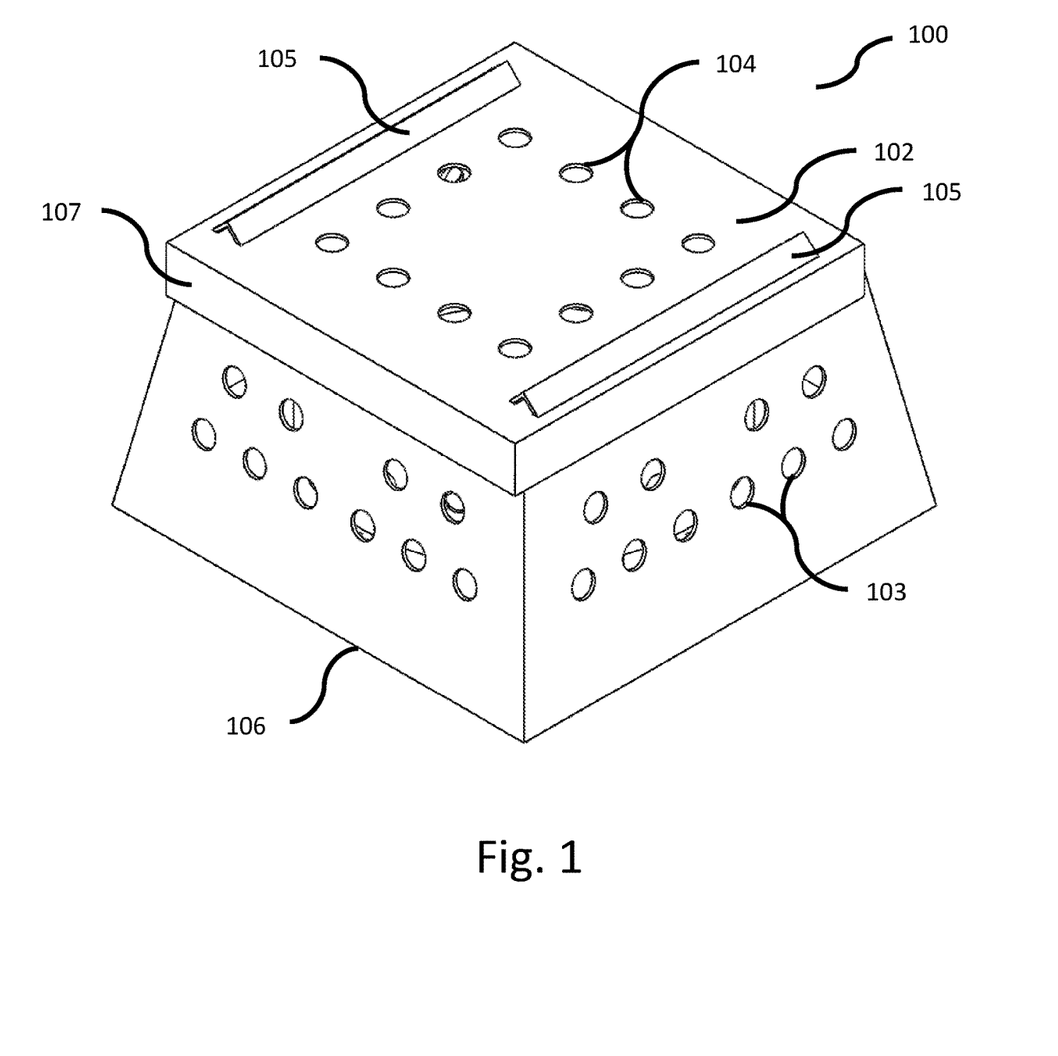
FIG. 1 is a perspective view of an apparatus for safe chick transportation, according to a preferred embodiment of the invention.

FIG. 1 is a perspective view of an apparatus for safe chick transportation, according to a preferred embodiment of the invention. According to the embodiment, a box for safe chick transportation 100 comprises a truncated or frusto-section (or frustum) of a rectangular pyramid structure 101 comprising a top, a bottom, and four sides, with a greater lineal dimension at the base 106 (i.e. the bottom of the structure) than at its top 404 (referring to FIG. 4) such that when grouped into a plurality of boxes (in excess of two) placed side-by-side abutting in relation one to the other, the wider bottom provides a V-shaped passageway between the plurality of boxes for adequate ventilation. Dimensions for the bottom of the box, in a rectangular embodiment, may be 10 to 16 inches by 8 to 14 inches with preferred dimensions of 13 by 11 inches to form, in some embodiment, a rectangular box. Dimensions for the top of the box may be 7.5 to 11.5 inches by 8.75 to 12.75 inches with preferred dimensions of 9.5 by 10.75 inches. An angle formed by the lineal dimension of the sides may be 75 to 85 degrees with a preferred angle of 80 degrees. A height of the sides may be 7 to 9 inches with a preferred height of 8 inches. Box 101 may further comprise a plurality of through-holes 103 on all sides for ventilation. Box 101 may be made of corrugated cardboard, fiberboard, plastic construction, or like material wherein at least a portion may be individually formed and joined together by fasteners, adhesive tape, glue, and the like. In other embodiments, box 101 may be constructed from one piece of material and folded and connected to form box 101. The construction of box 101 using a truncated or frusto-section of a rectangular pyramid advantageously provides an overall box construction with considerable transverse strength to enhance its ability to withstand stacking of like box construction.

In a preferred embodiment, box 101 further comprises lid 102 comprising, at least, a front lid edge, a back lid edge, and two opposite side lid edges. In some embodiments, lid 102 may comprise a plurality of flaps 107 that extend from at least two edges of lid 102 that may cause the lid to be operable to slidably fit over the upper edges 404 (referring to FIG. 4) of box 101. In some embodiments, lid 102 may comprise a plurality of wedge members 105 or at least two elongated striated partitions 105 along the top surface to, for example, create a ventilation space for stacked boxes. In some embodiments, lid 102 may comprise a plurality of through-holes 104; however in some embodiments, lid 102 may be solid.

In the event plastic is used for the construction, integral ridges may be used to permit separation of adjacent stacked boxes so as to permit air circulation.

In some embodiments, the box may be cube-shaped or rectangular with an equal size to the top and bottom. In other embodiments, the vessel may be cylindrical wherein a plurality of cylinders may be grouped by a bigger box (referring to FIGS. 10 and 11).

Figure 2:
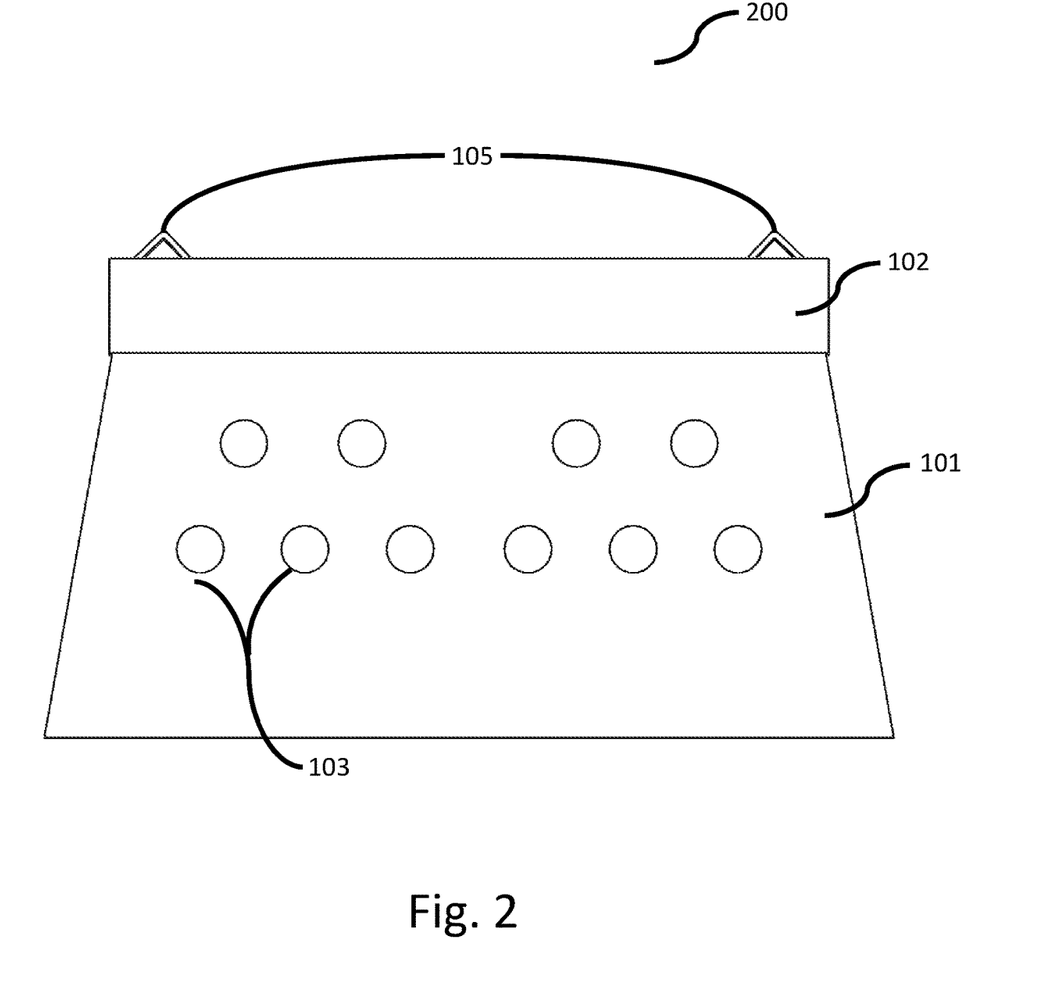
FIG. 2 is a front view of an apparatus for safe chick transportation, according to a preferred embodiment of the invention.

FIG. 2 is a front view of apparatus 200 for safe chick transportation, according to a preferred embodiment of the invention. According to the embodiment, a height of each of the sides of box 101 may be 7 to 9 inches with a preferred height of 8 inches.

Figure 3:
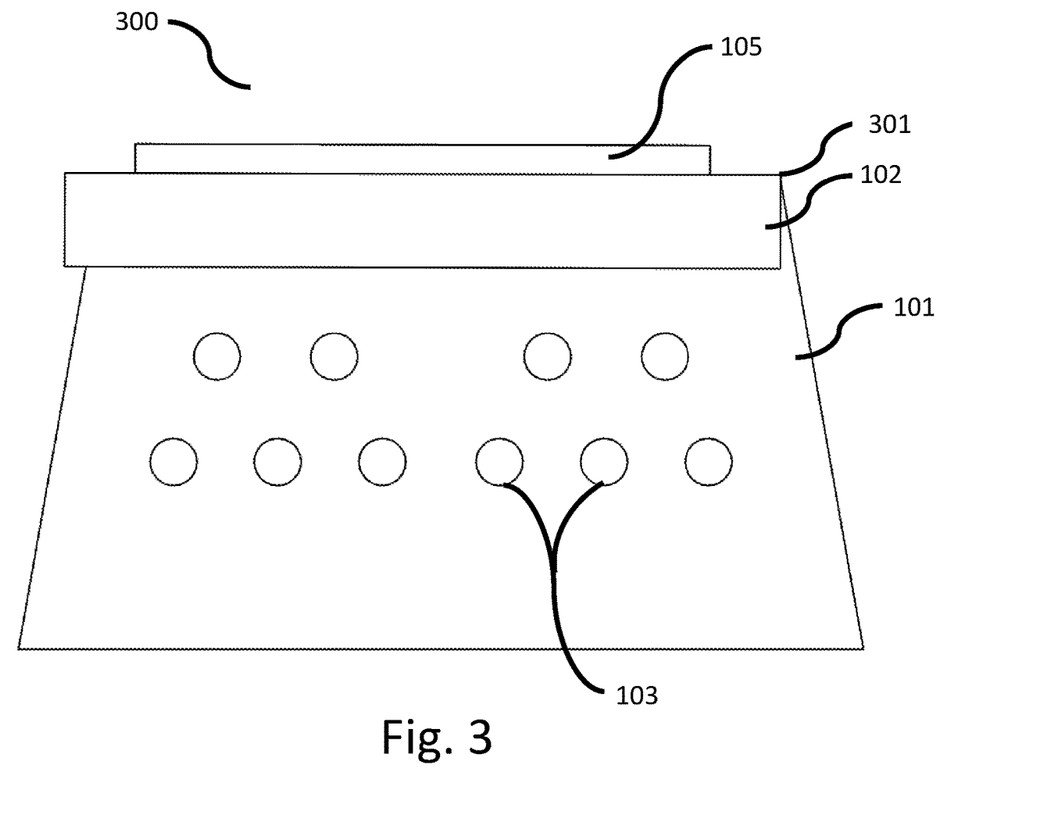
FIG. 3 is a side view of an apparatus for safe chick transportation, according to a preferred embodiment of the invention.

FIG. 3 is a side view of apparatus 300 for safe chick transportation, according to a preferred embodiment of the invention. According to the embodiment, lid 102 comprising, at least, a front lid edge, a back lid edge, and two opposite side lid edges further comprising a plurality of flaps 107 (referring to FIG. 1) that extend from at least two edges of lid 102 that may cause lid 102 to be operable to slidably fit over the upper edges 404 (referring to FIG. 4) of box 101, and may further comprise wedge members 105 to, for example, create a ventilation space for stacked boxes. Further according to the embodiment, lid 102 may be integrally and foldably attached at fold 301.

Figure 4:
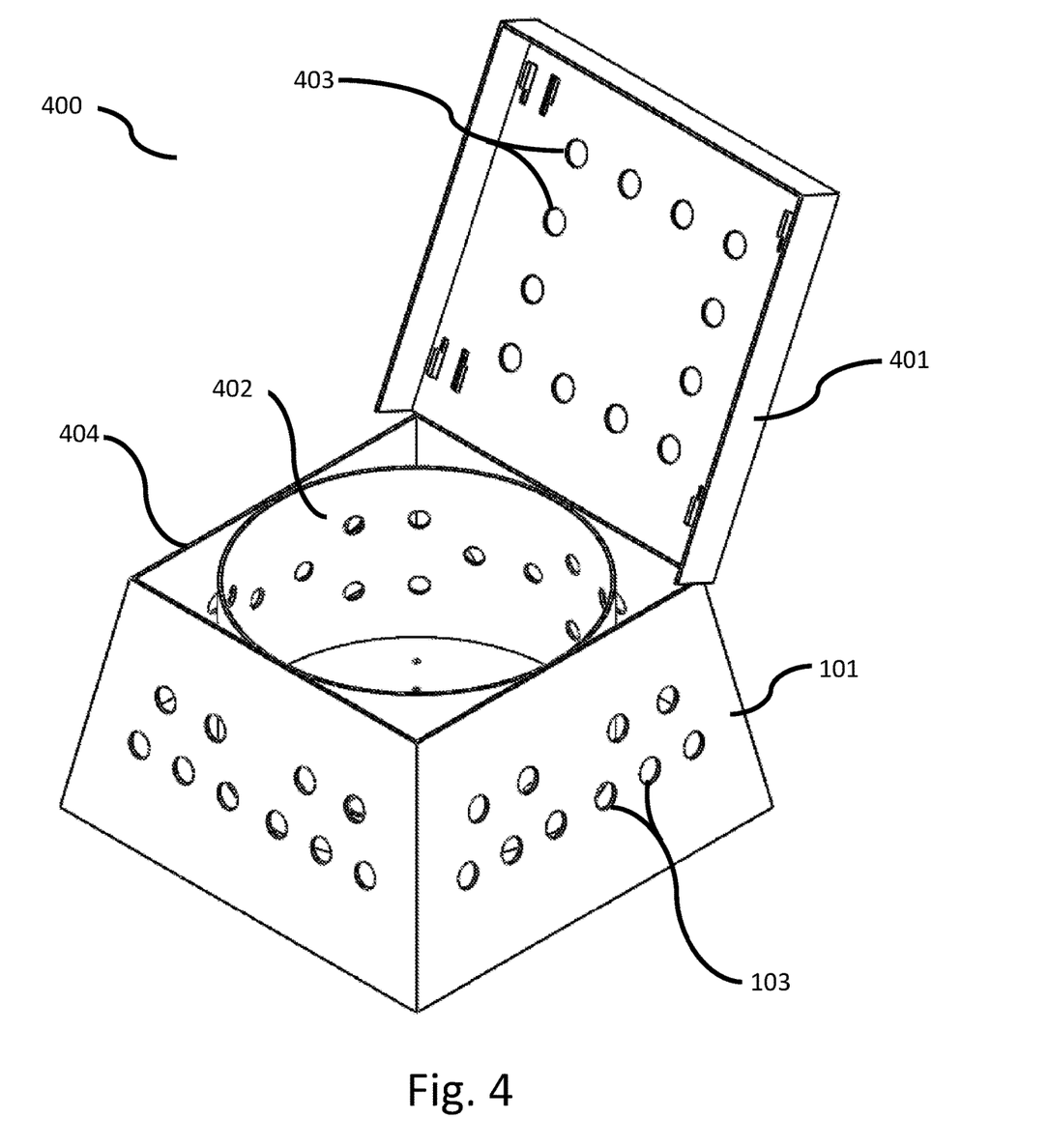
FIG. 4 is a perspective view of an opened apparatus for safe chick transportation with an inserted cylindrical member, according to a preferred embodiment of the invention.

FIG. 4 is a perspective view of opened apparatus 400 for safe chick transportation with an inserted cylindrical member 402, according to a preferred embodiment of the invention. According to the embodiment, a vertically aligned cylindrical insert 402 is placed within the rectangular pyramid box 101 encompassing at least a portion of the internal area thereby eliminating corners when box 101 receives chicks into the main chamber within cylindrical insert 402. In a preferred embodiment, the diameter of the cylindrical insert corresponds to the width and length of the box and encompasses the height from the bottom to the top. In some embodiments, a width of the cylindrical insert is in close proximity to the four sides of box 101, that is within 2-15 mm from the sides of box 101. In some embodiments, the bottom may be (1) a false bottom to create compartment 901 (referring to FIG. 9) or, (2) in other embodiments whereby there is an absence of compartment 901, the bottom of box 101. In some embodiments, a height of cylindrical insert 402 may be 4 to 8 inches with a preferable height of 6 inches and a diameter of 7 to 13 inches. In some embodiments, cylindrical insert 402 may be elliptical in shape to maximize the internal space when inserted into a rectangularly shaped box 101.

Accordingly, a body with parallel circular bases and a wall of constant circular cross-section or a right circular cylinder maybe be inserted or integrally formed inside the box thereby removing the corners where chicks may congregate and potentially cause mortality of one or more chicks. Advantageously, a cylindrical shape keeps a plurality of chicks on equal footing thereby naturally dispersing them in various environmental conditions. In some embodiments, a truncated cylinder resembling a cylinder of which an end portion has been cut along a plane that may not be parallel to the base of the cylinder may be used. In other embodiments, a truncated or frustum of a right circular cone may be used whereby the plane of the truncation may (or may not be) parallel with the base. It should be appreciated by those with ordinary skill in the art that this alternate embodiment may be referred to as frusto-canonical in shape or be a conical frustum.

In some embodiments, lid 401 may be integrally and foldably attached to box 101 and may comprise a plurality of through-holes 403 for ventilation.

Figure 5:
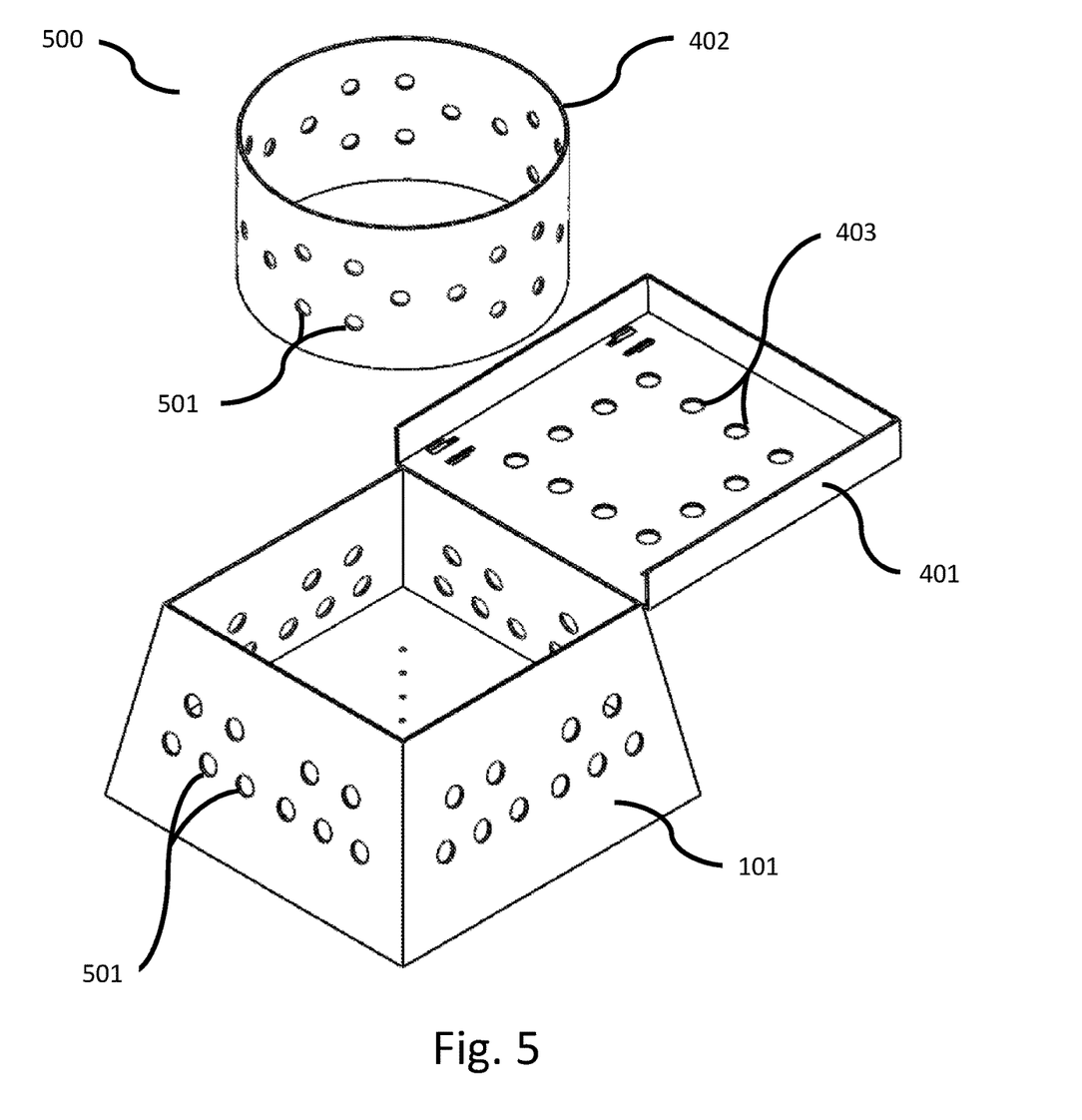
FIG. 5 is a perspective view of an opened apparatus for safe chick transportation with an extracted cylindrical member, according to a preferred embodiment of the invention.

FIG. 5 is a perspective view of opened apparatus 500 for safe chick transportation with an extracted cylindrical member 402, according to a preferred embodiment of the invention. According to the embodiment, cylindrical insert 402 may comprise a plurality of through-holes 501 for ventilation.

Figure 6:
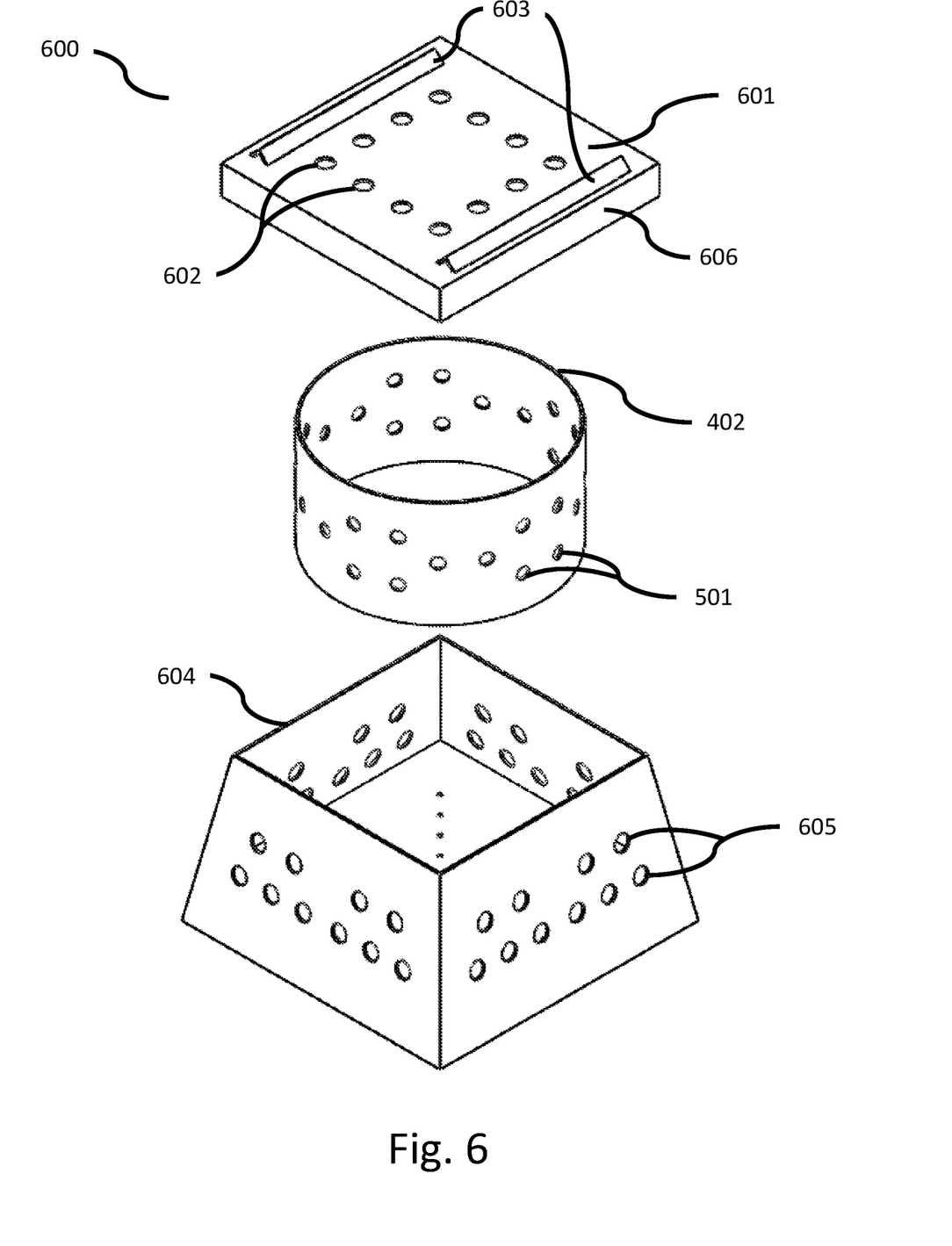
FIG. 6 is a perspective view of an opened apparatus for safe chick transportation with a cylindrical member removed, according to another embodiment of the invention.

FIG. 6 is a perspective view of opened apparatus 600 for safe chick transportation with a cylindrical member 402 removed, according to another embodiment of the invention. According to the embodiment, apparatus 600 comprises a removable lid 601 comprising, at least, a front lid edge, a back lid edge, and two opposite side lid edges and a plurality of flaps 606 that extend from at least two lid 601 edges that may be operable to slidably fit over the upper edges of box 604. In some embodiments, lid 601 may comprise a plurality of wedge members 603 to, for example, create a ventilation space as described earlier. In some embodiments, lid 601 may comprise through-holes 602 to provide ventilation. In some embodiments, box 604 may comprise through-holes 605 to provide ventilation.

Figure 7:
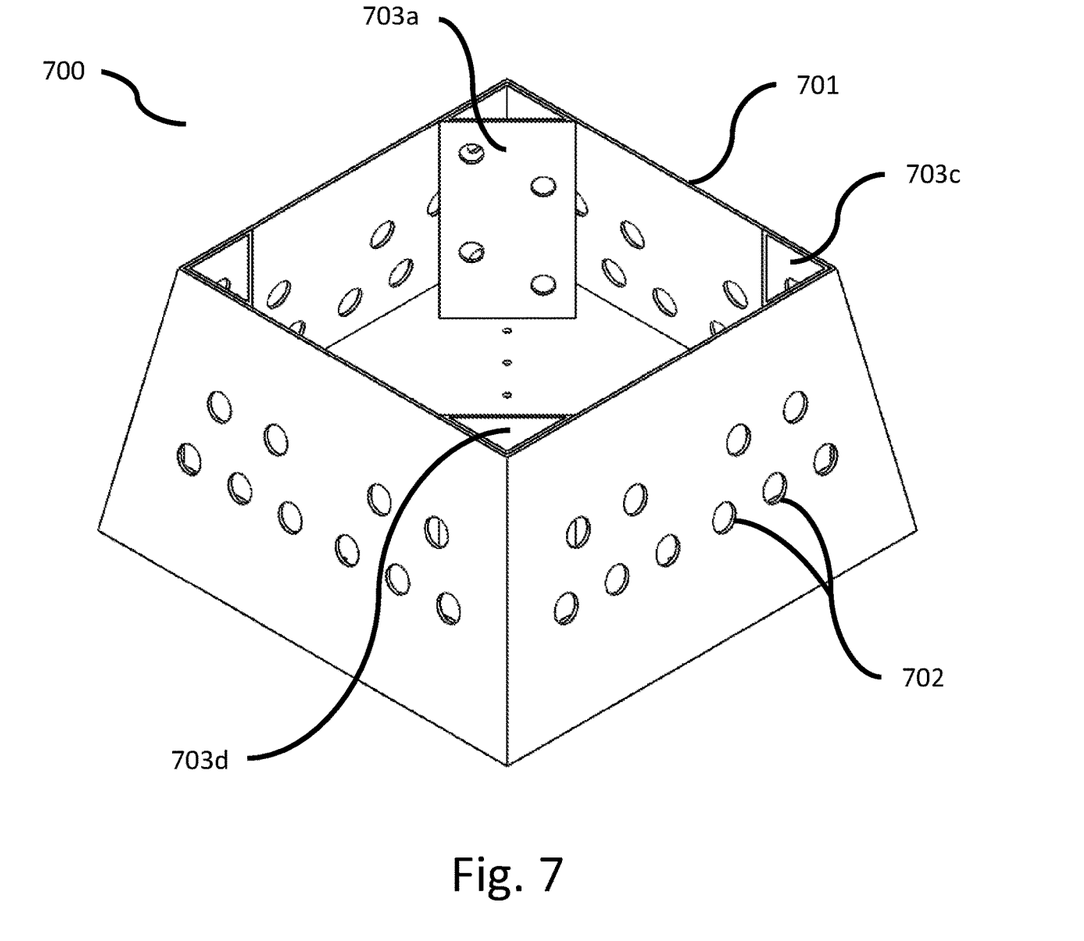
FIG. 7 is a perspective view of an opened apparatus for safe chick transportation with inserted triangular wedge members, according to another embodiment of the invention.

FIG. 7 is a perspective view of opened apparatus 700 for safe chick transportation with inserted triangular wedge members, according to another embodiment of the invention. According to the embodiment, a plurality of triangular or wedge members 703a, 703b, 703c, and 703d may be placed in each corner within box 701 to remove access to the corners by chicks. For example, the wedge members 703a, 703b, 703c, and 703d may create an octagonal interior chamber thereby eliminating corners to achieve a similar benefit described herein with respect to cylindrical insert 402. It should be appreciated that the size and shape of the wedge members may result in a differently shaped interior chamber, for example, a hexagonal, hexakaidecagon or another multi-sided polygon while keeping corners inaccessible by chicks. In some embodiments, the wedge may have a concave side thereby creating a substantially cylindrical internal chamber. In some embodiments, box 701 may comprise through-holes 702 to provide ventilation. In some embodiments, wedge members 703a, 703b, 703c, and 703d may comprise a plurality of through-holes to provide ventilation.

Figure 8:
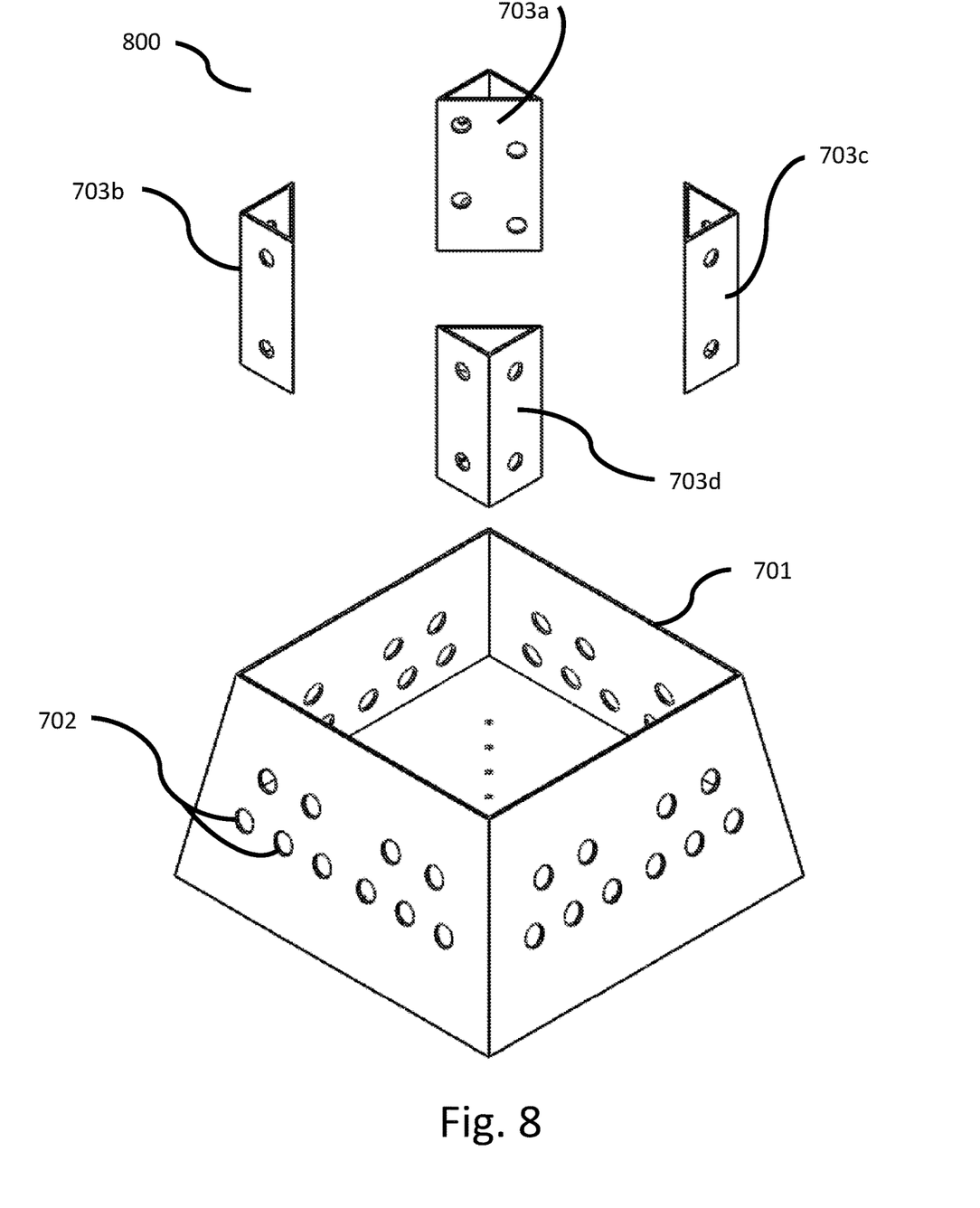
FIG. 8 is a perspective view of an opened apparatus for safe chick transportation with extracted triangular wedge members, according to another embodiment of the invention.

FIG. 8 is a perspective view of opened apparatus 800 for safe chick transportation with extracted triangular wedge members 703a, 703b, 703c, and 703d, according to an embodiment of the invention. It should be appreciated that the height of wedge members 703a, 703b, 703c, and 703d may be the same as the internal height of box 701.

Figure 9:
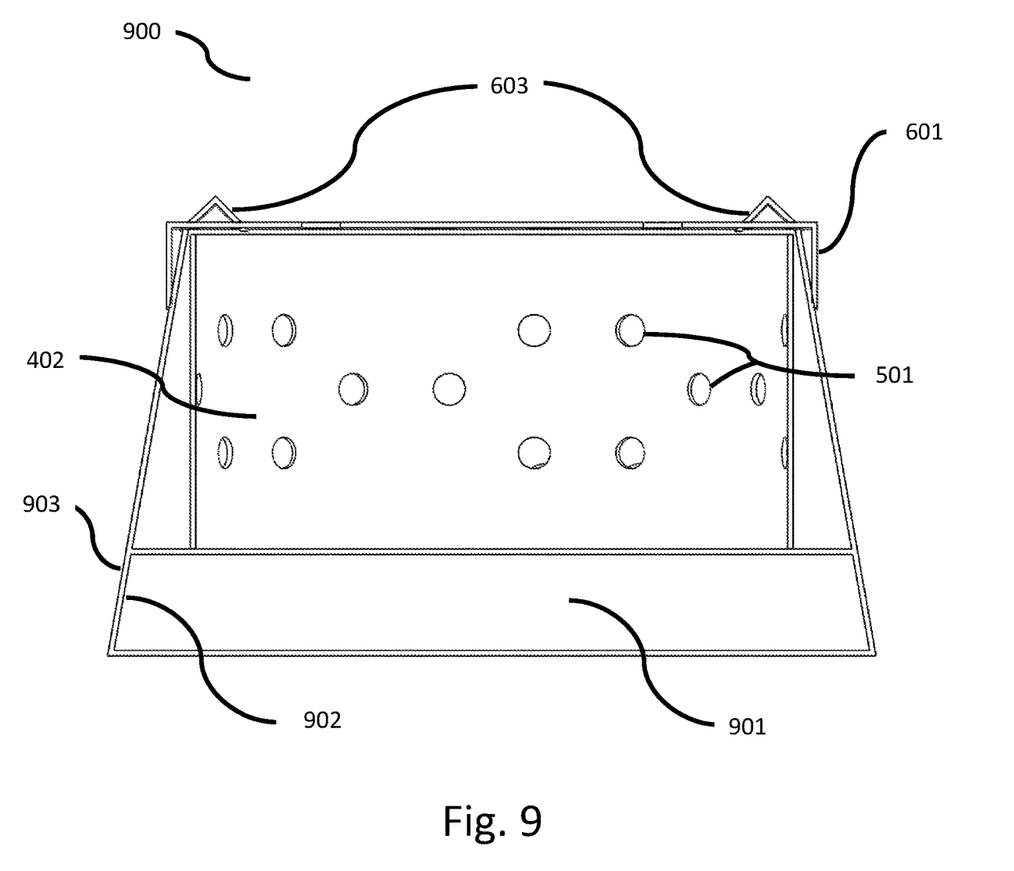
FIG. 9 is a cross section illustrating an apparatus for safe chick transportation comprising a temperature control compartment, according to a preferred embodiment of the invention.

FIG. 9 is a cross section illustrating an apparatus for safe chick transportation comprising a temperature control compartment, according to a preferred embodiment of the invention. According to the embodiment, a cross section 900 illustrating a base compartment 901 is shown whereby base compartment 901 is operable to advantageously accommodate one or more temperature control elements such as a portable container (such as a bag, rigid container, or the like) filled with ice or a refrigerant to reduce the temperature in a hot environment, or a hot pack or heating pad to increase temperatures during colder shipments. In some embodiments, an electrical device in conjunction with a self-contained power source, providing a means for temperature control many be received within compartment 901.

It should be appreciated that a person having ordinary skill in the art would appreciate that any portable heating or cooling source may be received by compartment 901 including, but not limited to: a moist heating pad; an electric heating pouch similar in form to an electric heating pad; a sodium acetate heat pad employing a one-time exothermic chemical reaction (commonly known as, hand warmers); high specific-heat capacity materials gradually releasing heat over time, for example, a hot water bottle; a microwavable heating pad made out of a thick insulative fabric such as flannel and filled with grains such as wheat, buckwheat or flax seed; phase-change materials to operate at a fixed temperature; and the like.

In a preferred embodiment, a top to base compartment 901 may be placed within the box as a separate piece or as an integrally formed member folded into place during construction of the box to create a false, or multilayered bottom. In some embodiments, the bottom may have a plurality of through-holes to disperse heat or cold form the temperature control elements.

In some embodiments, sides of the base compartment 902 abut against parallel side surfaces of the container 903.

Figure 10:
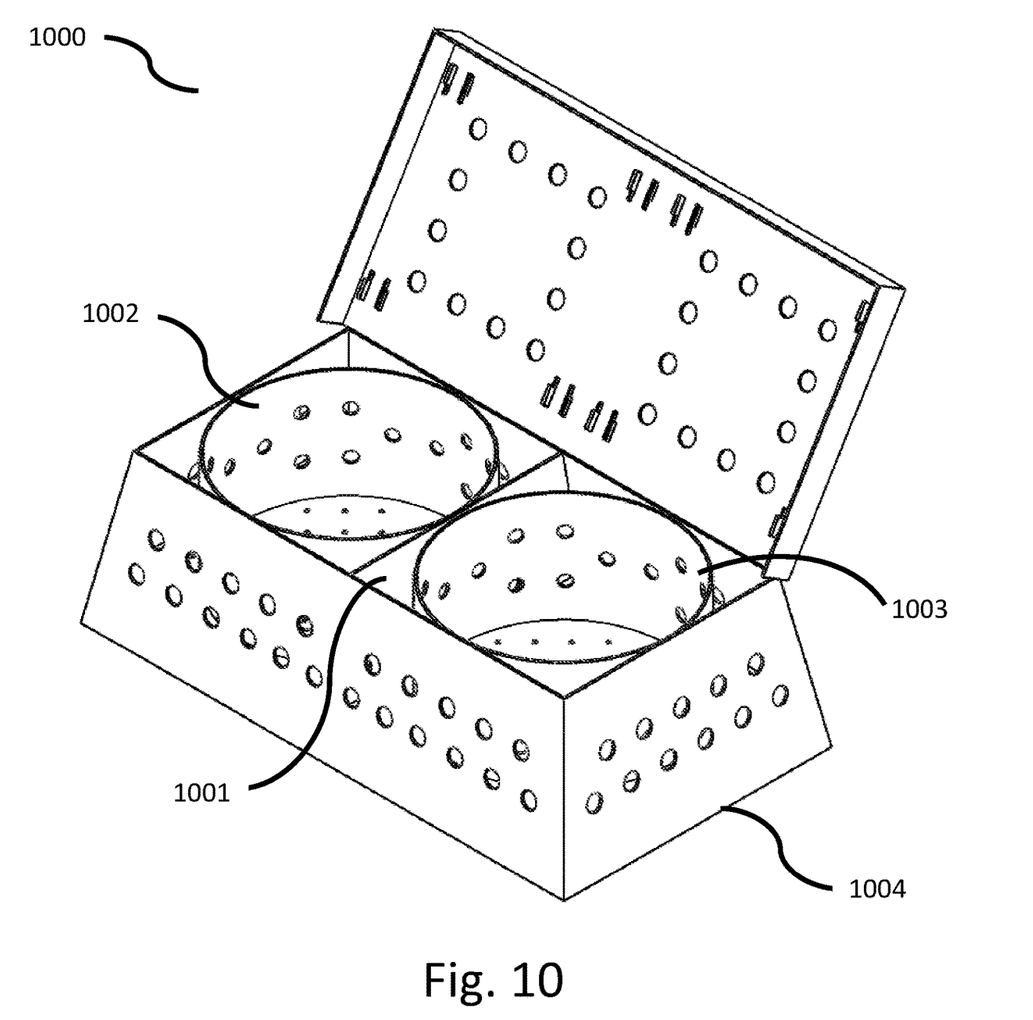
FIG. 10 is a perspective view of a multi-unit apparatus for safe chick transportation, according to an embodiment of the invention.

FIG. 10 is a perspective view of multi-unit apparatus 1000 for safe chick transportation, according to an embodiment of the invention. According to the embodiment, box 1004 comprises a plurality of cylindrical inserts 1002 and 1003 within one box structure 1004 with a divider member 1001. One with ordinary skill in the art can appreciate that such an arrangement provides a mechanism for storing more chicks within one box to provide options in organization while reducing construction requirements.

Figure 11:
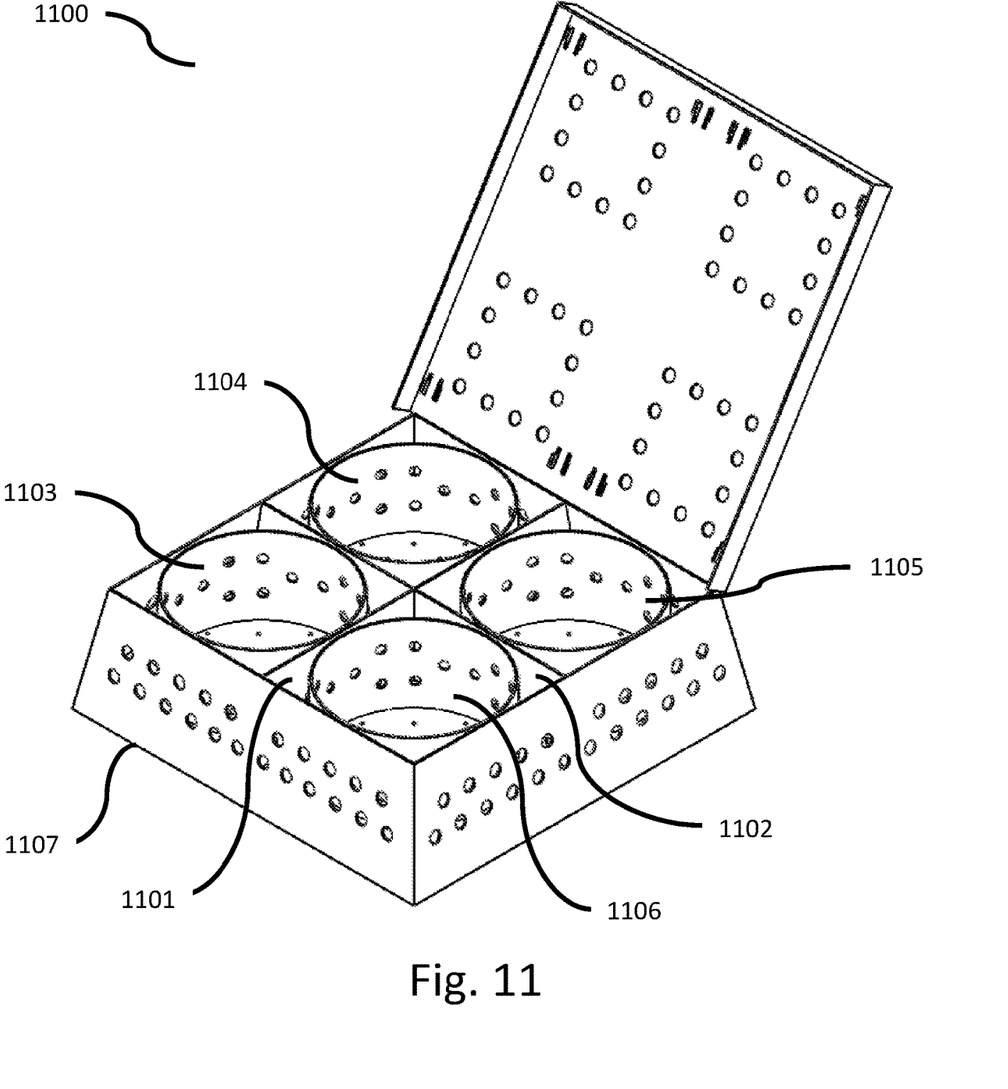
FIG. 11 is a perspective view of another multi-unit apparatus for safe chick transportation, according to an embodiment of the invention.

FIG. 11 is a perspective view of multi-unit apparatus 1100 for safe chick transportation, according to an embodiment of the invention. According to the embodiment, box 1107 comprises a plurality of cylindrical inserts 1103, 1104, 1105, and 1106 within one box structure 1107 with a divider members 1101 and 1102. One with ordinary skill in the art can readily see that such an arrangement provides a mechanism for storing more chicks within one box to provide options in organization while reducing construction requirements.

The skilled person will be aware of a range of possible modifications of the various embodiments described above. Accordingly, the present invention is defined by the claims and their equivalents.

What is claimed is:

1. An apparatus for transportation of poultry, the apparatus comprising:
   two containers, a first container, of the two containers, comprising a main chamber formed by four sides each having an upper edge and lower edge and a bottom attached to the lower edges;
   a second container, of the two containers, the second container being an elongated cylindrical container wherein the second container is insert infixed vertically and fully contained within the first container and configured to contain poultry during transportation, wherein:
      the second container has opposed upper and lower ends,
      a diameter of the second container corresponds to a width and a length of the first container,
      the second container is in contact with at least three sides of the container; and
      the second container comprises a first plurality of through-holes for ventilation within the main chamber; and
   wherein the first container comprises a second plurality of through-holes along the four sides, and a third plurality of through-holes at the bottom for ventilation within the main chamber.

2. The apparatus of claim 1, further comprising a lid comprising:
   a front lid edge;
   a back lid edge;
   two opposite side lid edges; and
   a plurality of flaps that extend from at least two lid edges that cause the lid to be operable to slidably fit over the upper edges of the first container.

3. The apparatus of claim 1, wherein the four sides are inwardly and upwardly inclined forming a truncated section of a rectangular pyramid.

4. The apparatus of claim 1, further comprising at least one wedge member attached to an exterior surface of the first container to separate the container from another container.

5. The apparatus of claim 1, wherein the first container comprises a greater lineal dimension at a base portion of the container than at a top surface of the container, such that when grouped in any quantity, a V-shaped passageway is formed for ventilation.

6. The apparatus of claim 1, wherein the first container further comprises at least two elongated striated partitions along the top surface.

7. The apparatus of claim 1, further comprising a base compartment comprising four sides, bottom, and a top.

8. The apparatus of claim 2, further comprising a base compartment comprising four sides, a bottom edge, and a top surface.

9. The apparatus of claim 8, wherein the upper and lower ends of the second container are in contact with an inner surface of a lid of the first container and the top surface of the base compartment in a manner where the second container is vertically positioned between the lid and the base compartment when the first container is closed.

10. The apparatus of claim 1, wherein width of the second container is in close proximity to the four sides of the container.

11. The apparatus of claim 8, wherein the top of the base compartment is comprised as an integrally formed member folded into place during the construction of the first container or as a separate piece placed within the container.

12. The apparatus of claim 11, wherein the top of the base compartment further comprises a fourth plurality of through-holes for ventilation.

13. The apparatus of claim 8, wherein the base compartment comprises a secondary chamber operable to receive one or more temperature control elements.

14. The apparatus of claim 8, wherein the four sides of the base compartment abut against parallel side surfaces of the first container.

15. The apparatus of claim 8, wherein the bottom edge of the base compartment rests on the bottom of the first container in a manner where the base compartment is deposited inside the first container to create a multilayered bottom.

16. An apparatus for transportation of poultry, the apparatus comprising:
   a container comprising four sides each having an upper edge, a lower edge, a bottom attached to the lower edges, and a removably attachable top lid, wherein the container comprises a greater lineal dimension at the bottom of the container than at the top lid; and a plurality of triangular or wedge-shaped members placed within each corner of the container thereby creating an octagonal interior chamber configured to prevent access by the poultry, to the corners of the container during transportation, wherein each of the plurality of triangular or wedge-shaped member comprises a first plurality of through-holes for ventilation;

wherein the container comprises a second plurality of through-holes along the four sides and a third plurality of through-holes at the bottom for ventilation.

* * * * *